United States Patent [19]

Stolzer

[11] Patent Number: 5,598,636

[45] Date of Patent: Feb. 4, 1997

[54] RECIPROCATING DRIVE SAW MECHANISM

[75] Inventor: Timothy J. Stolzer, Pickens, S.C.

[73] Assignee: Ryobi Motor Products, Easley, S.C.

[21] Appl. No.: 291,441

[22] Filed: Aug. 17, 1994

[51] Int. Cl.⁶ .................................................. B27B 11/02
[52] U.S. Cl. .................... 30/394; 30/393; 74/55; 83/776
[58] Field of Search ........................... 30/392, 393, 394; 74/50, 55, 56, 57; 83/647, 776, 779, 628; 173/203, 205

[56] References Cited

U.S. PATENT DOCUMENTS

| Re. 23,373 | 6/1951 | Oschwald | 74/50 |
|---|---|---|---|
| 3,800,647 | 4/1974 | Morse et al. | 83/628 X |
| 4,240,204 | 12/1980 | Walton, II et al. | 30/393 |
| 4,385,443 | 5/1983 | O'Banion | 30/393 |
| 4,436,163 | 3/1984 | Simpson | 74/50 X |
| 4,550,501 | 11/1985 | Moores, Jr. et al. | 30/393 |
| 4,570,500 | 2/1986 | Richter | 74/55 X |
| 4,628,605 | 12/1986 | Clowers | 30/393 |
| 4,884,344 | 12/1989 | Martinez et al. | 30/394 |
| 5,083,376 | 1/1992 | Lentino | 30/392 |
| 5,134,777 | 8/1992 | Meyer et al. | 30/392 |
| 5,205,043 | 4/1993 | Batt et al. | 30/393 |
| 5,212,887 | 5/1993 | Farmerie | 30/393 |

FOREIGN PATENT DOCUMENTS

| 601914 | 8/1934 | Germany | 30/392 |

*Primary Examiner*—Scott A. Smith
*Assistant Examiner*—Jay A. Stelacone
*Attorney, Agent, or Firm*—Brooks & Kushman P.C.

[57] ABSTRACT

An apparatus for reciprocatingly orbiting a saw blade with respect to a workpiece is provided. The saw blade is cammingly driven through a cam track to reciprocate the saw blade generally along a first axis to saw the workpiece. The saw blade is contemporaneously driven through a bearing to move the saw blade about a pivotal axis to space the saw blade from the workpiece when it is not being sawed. Cam tracks of irregular configurations are provided for improving cutting efficiency.

5 Claims, 3 Drawing Sheets

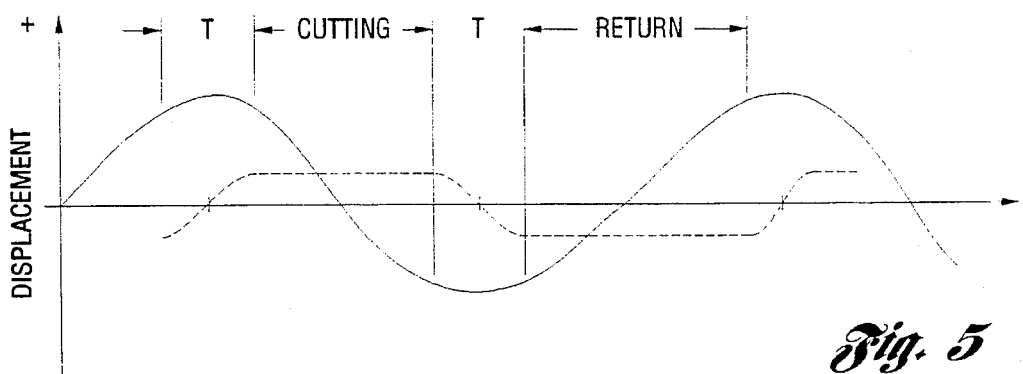
Fig. 5
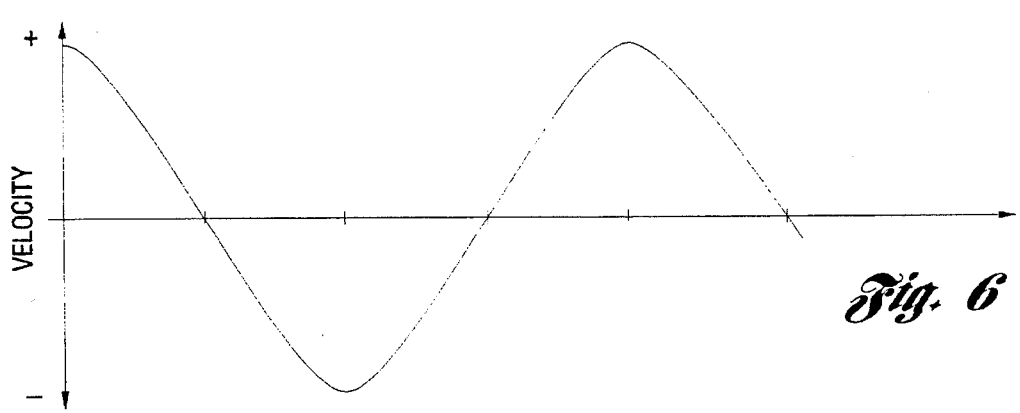
Fig. 6
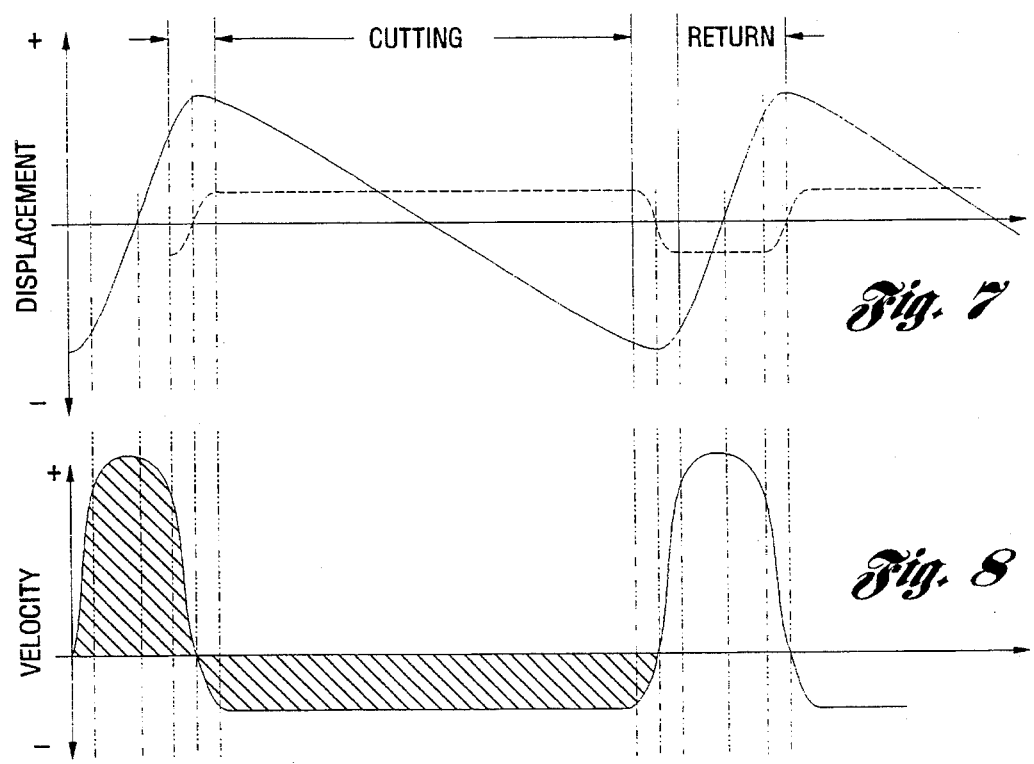
Fig. 7
Fig. 8

5,598,636

RECIPROCATING DRIVE SAW MECHANISM

TECHNICAL FIELD

The present invention relates to reciprocating saws. More particularly, this invention relates to drive mechanism for imparting orbital movement to saw blades.

BACKGROUND OF THE INVENTION

It is well known in the art that imparting orbital motion to a blade in a reciprocating saw greatly improves the cutting accuracy. The blade is moved in an orbital path so as to cause the saw teeth to cut into the workpiece during the pull stroke and to lift free of the workpiece during the return stroke.

As a result of the blade lifting free of the workpiece during the return stroke, the teeth do not rub against the workpiece. This leads to improved efficiency and reduced vibration; and sawdust and waste chips can be more effectively removed from the cut.

Many complex orbital-action saws have been developed, but typically these systems are awkward and expensive to manufacture due to their complexity. In addition, the complex internal motions generated by these systems make them not easily adaptable to heavy-duty, rough-cutting or industrial reciprocating saws. Similarly, this added complexity prevents orbital-action mechanisms from being used on inexpensive saws.

Such complex reciprocating saws are disclosed in U.S. Pat. No. 5,212,887 to Farmerie, U.S. Pat. No. 4,628,605 to Clowers, and U.S. Pat. No. 2,705,980 to Papworth.

A major limitation of these saws is that the orbital path of the saws provides cutting in only a limited portion of the rotational travel of the driver mechanism, thus resulting in poor cutting efficiency.

Another limitation of prior art saws is that they have complex mechanisms which are difficult to manufacture.

Accordingly, it is desirable to develop a reciprocating saw with orbital action which is adaptable for use in both heavy-duty industrial and inexpensive consumer environments to achieve improved cutting efficiency.

SUMMARY OF THE INVENTION

The present invention contemplates a reciprocating saw for driving a saw blade. The saw has a housing and a blade carrier. A drive motor is located within the housing and includes a rotatably driven drive gear. The blade carrier includes a blade receiving portion for receiving the saw blade and being reciprocally slidable generally along a first axis and a guide portion for slidably receiving the blade receiving portion and for pivotally mounting the blade carrier to the housing. A ring gear is rotatably engaged with the drive gear and has a cam track formed thereon operatively engaging the follower for driving the follower and the blade carrier in a reciprocal manner generally along said first axis.

The present invention also contemplates a orbital-action reciprocating saw for driving a saw blade. The saw includes a housing having a drive motor located therein, the drive motor having a rotatably driven drive gear. The blade carrier has a blade receiving portion for receiving the saw blade and a guide portion for slidably receiving the blade receiving portion and for pivotally mounting the blade carrier to the housing. A follower is connected to the blade receiving portion of the blade carrier for transmitting reciprocating motion thereto generally along a first axis. A bearing is engaged with the guide portion of the blade carrier for transmitting transverse motion to the blade carrier in a direction perpendicular to the first axis. A ring gear is rotatable by the drive gear and has a pair of eccentric cam tracks formed thereon which are in a driving relationship respectively with the follower and bearing for respectively driving the follower and bearing when the drive motor is rotating the ring gear for moving the blade carrier in an orbital path.

The present invention further contemplates a method of reciprocating a saw blade with respect to a workpiece comprising the following steps: (1) cammingly driving the saw blade through a first cam track to reciprocate the saw blade along a longitudinal axis to saw the workpiece, and (2) cammingly driving the saw blade through a second cam track to move the saw blade about a pivotal axis to space the saw blade from the workpiece when it is not being sawed.

Another aspect of the present invention contemplates an orbital-action saw, as recited above, wherein the internal track of the pair of eccentric cam tracks has a non-circular configuration for decreasing the amount of cam rotation required for the return stroke of the blade.

Accordingly, one object of the present invention is to provide an orbital-action reciprocating saw which is adaptable for industrial use and heavy-duty cutting.

Another object of the present invention is to provide an orbital-action reciprocating saw having a simple design which is easy to manufacture.

A further object of the present invention is to provide an orbital-action reciprocating saw which provides orbital and reciprocating motion to a saw blade by and through a single rotatable cam.

Yet another object of the present invention is to provide an orbital-action reciprocating saw having improved cutting efficiency by decreasing the amount of rotational travel of the driver mechanism required for the return stroke of the blade.

BRIEF DESCRIPTION OF THE DRAWINGS

FIG. 5 is a graphical illustration of the saw blade displacement vs. the angle of rotation ($\Theta$) of the ring gear according to the track configuration shown in FIG. 3.

FIG. 6 is a graphical illustration of the saw blade velocity vs. the angle of rotation ($\Theta$) of the ring gear according to the track configuration shown in FIG. 3.

FIG. 7 is a graphical illustration of the saw blade displacement vs. the angle of rotation ($\Theta$) of the ring gear according to the track configuration shown in FIG. 4.

FIG. 8 is a graphical illustration of the saw blade velocity vs. the angle of rotation ($\Theta$) of the ring gear according to the track configuration shown in FIG. 4.

BEST MODES FOR CARRYING OUT THE INVENTION

Figure 1:
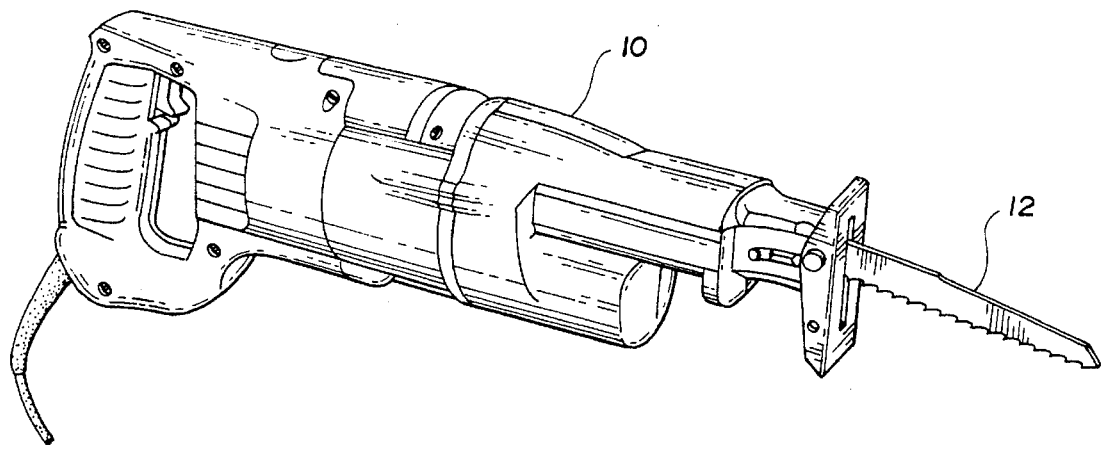
FIG. 1 is a perspective view of an orbital-action reciprocating saw according to the present invention.

Referring to FIG. 1, an industrial orbital-action reciprocating saw is shown according to the present invention. A housing 10 encloses a drive motor which imparts orbital movement to the saw blade 12. The present invention is intended for use with heavy-duty, rough cutting or industrial reciprocating saws; however, the present invention is easily adaptable to smaller and less expensive saws.

Figure 2:
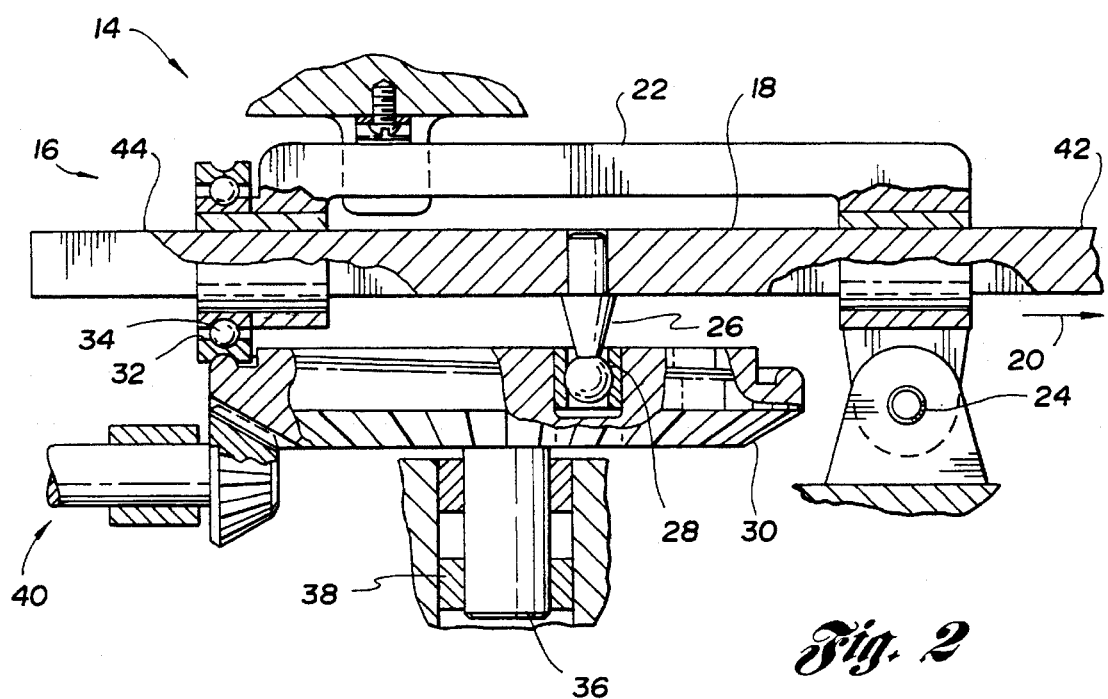
FIG. 2 is a vertical cross-sectional view of a reciprocating saw according to the present invention.

FIG. 2 shows the driver mechanism 14 which orbitally reciprocates the saw blade 12. A blade carrier 16 is provided for carrying the saw blade 12. The blade receiving portion 18 of the blade carrier 16 receives the saw blade 12 and is reciprocally slidable generally along a first axis 20. A guide portion 22 of the blade carrier 16 slidably receives the blade receiving portion 18 of the blade carrier 16 and is pivotally mounted to the housing 10 at the pivot joint 24. A cam follower pin 26 is connected to the blade receiving portion 18 of the blade carrier 16. The cam follower pin 26 extends into a driven relationship with the internal cam track 28, thus imparting reciprocating motion to the blade receiving portion 18 of the blade carrier 16 when the beveled ring gear 30 rotates. The motion of the cam follower pin 26, which follows the internal cam track 28, drives the blade receiving portion 18 of the blade carrier 16 generally along the first axis 20, thus providing reciprocating motion to the saw blade 12.

The driver mechanism 14 also provides transverse motion to the saw blade 12. Transverse motion is transmitted to the blade carrier 16 in a direction perpendicular to the first axis 20 by means of the external cam track 32 and the bearing 34. The ring gear 30 rotates about a stub axle shaft 36. A bushing 38 supports the stub axle shaft 36 with respect to the housing. As the ring gear 30 rotates, the bearing 34 moves in a direction perpendicular to the first axis 20 in response to variations in the external cam track 32. This movement of the bearing 34 forces the second guide portion 22 of the blade carrier 16 in the same direction, thus causing the blade carrier 16 to rotate about the pivot joint 24. This rotation of the blade carrier 16 facilitates movement of the saw blade 12 in an orbital path, which enables the saw blade 12 to cut a workpiece during one portion of the stroke and to lift away from the workpiece during a return portion of the stroke. Variations in the external cam track 32 may be manipulated to facilitate optimal movement of the saw blade 12 for improved cutting efficiency, efficient removal of sawdust and chips, and tool balance to avoid vibration.

The ring gear 30, which is located in the housing 10, is operatively connected between the driver 40 and both the internal and external cam tracks 28, 32. The ring gear 30 translates motion of the driver 40 to the cam tracks 28, 32.

As the drive motor rotates the driver 40, the ring gear 30 is rotated by the driver 40. As the ring gear 30 rotates, the cam follower pin 26 follows the motion of the internal cam track 28, thus imparting transverse motion to the blade receiving portion 18 of the blade carrier 16. Simultaneously, the bearing 34 follows the motion of the external cam track 32 in a direction perpendicular to the first axis 20, thus imparting transverse motion to the blade carrier 16. As a result of this transverse motion, the guide portion 22 of the blade carrier 16 rotates about the pivot joint 24. Accordingly, the saw blade 12 is reciprocated in an orbital path. The saw blade 12 cuts the workpiece as it is pulled toward the housing and is orbitally lifted away from the workpiece as it returns to a pre-cut position.

The guide portion 22 of the blade carrier 16 is pivotally mounted to the housing 10 at the pivot joint 24. The blade receiving portion 18 of the blade carrier 16 includes a first end 42 for receiving the blade 12, and a second end 44 which is slidably mounted with respect to the guide portion 22 of the blade carrier 16.

Figure 3:
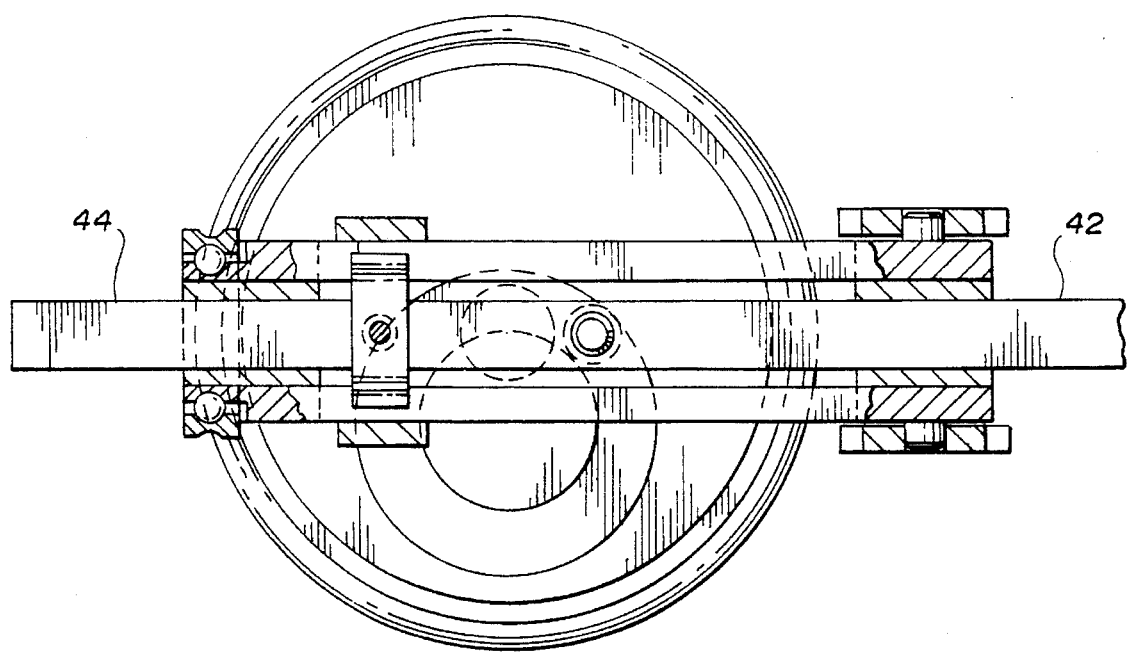
FIG. 3 is a cross-sectional plan view of a reciprocating saw driver mechanism according to the present invention.
Figure 4:
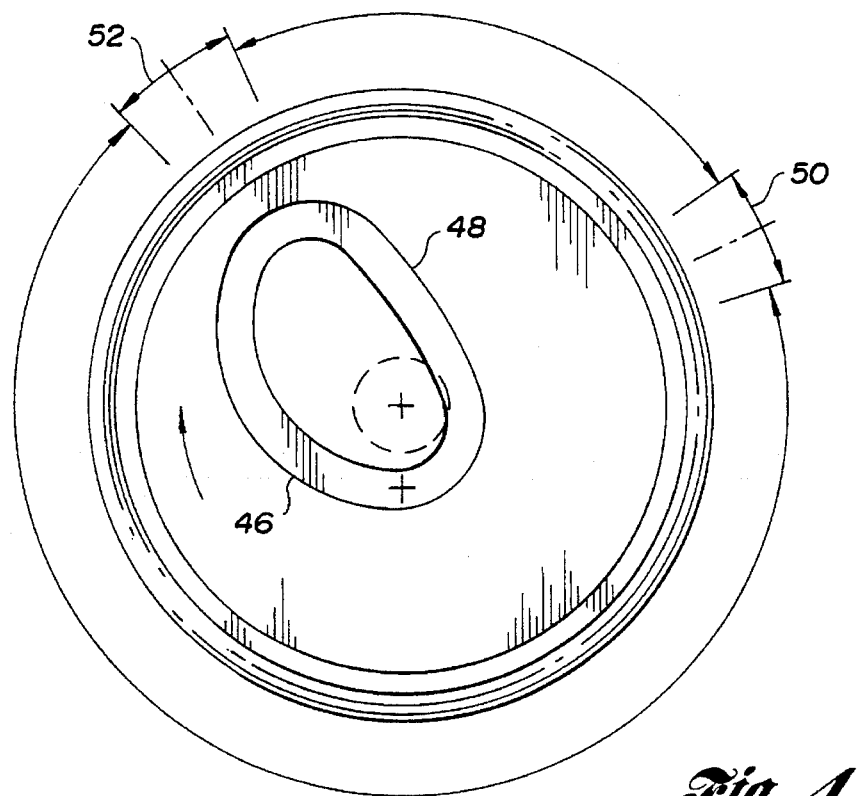
FIG. 4 is a ring gear for use in an alternative embodiment Of the invention.

As shown in FIGS. 3 and 4, different configurations for the internal cam track 28 may be employed to obtain different cutting characteristics. For example, FIG. 3 shows a round cam track 28 which simply orbits the saw blade 12 in a standard orbital manner. The behavior of the saw blade 12 according to the configuration shown in FIG. 3 corresponds with the graphical illustrations shown in FIGS. 5 and 6. FIG. 5 illustrates the relationship between displacement of the saw blade and rotation of the ring gear. In FIG. 5, the solid line illustrates displacement of the saw blade along the first axis 20, and the dashed line illustrates transverse displacement of the outer bearing 34 as the ring gear rotates. Cutting occurs during only a limited portion of the rotational stroke of the ring gear. The two transition zones and the return zone take up a large portion of the rotational travel of the ring gear. As a result, cutting efficiency is very poor using this type of a track configuration. Furthermore, as shown in FIG. 6, maximum cutting velocity is reached gradually and is only maintained for a brief portion of the ring gear rotation. This contributes to poor cutting characteristics.

However, as shown in FIG. 4, it may be desirable for the internal cam track 28 to have a non-circular configuration. The configuration of this internal cam track may be manipulated to reach a desired cutting profile. For example, as shown in FIG. 4, the internal cam track 28 may have a long region of decreasing radius 46 and a short region of increasing radius 48. Transition portion 50, 52 are also shown in FIG. 4 This cam track configuration corresponds with the graphical displacement and velocity illustrations shown in FIGS. 7 and 8. As shown in FIG. 7, when the follower is in cooperation with the long region of decreasing radius 46, the blade is being pulled toward the housing and is cutting the workpiece. Similarly, when the follower is in cooperation with the short region of increasing radius 48, the blade is lifting away from the workpiece and returning to the fully extended, pre-cut position. FIG. 7 illustrates the fact that the transition and return portions are drastically reduced when using this configuration in comparison with the transitions and return stroke shown in FIG. 5. As a result, the cutting efficiency is greatly improved using the configuration shown in FIG. 4. As shown in FIG. 8, the saw blade quickly returns to a pre-cut fully extended position when the follower is in cooperation with the short region of decreasing radius. As a result of this configuration of the cam track, the transition zones are very short and the saw blade quickly returns to a cutting position adjacent the workpiece. The saw blade is quickly brought up to maximum cutting speed and maintains this maximum speed throughout a large portion of the cutting stroke. Furthermore, as shown in FIG. 8, the saw blade maintains a cutting position throughout a large portion of the entire rotational stroke of the ring gear. These characteristics provide drastic improvements in efficiency.

One skilled in the art will appreciate that various internal cam track configurations may be employed to manipulate the cutting profile of the saw blade. Different non-circular configurations of the internal cam track may greatly increase the cutting efficiency of a reciprocating saw.

While the best modes for carrying out the invention have been described in detail, those familiar with the art to which the invention relates will recognize various alternative designs and embodiments for practicing the invention as defined the following claims.

What is claimed is:

1. A reciprocating saw for driving a saw blade, comprising:

a housing;

a drive motor located within the housing and having a rotatably driven drive gear;

a blade carrier having a blade receiving portion for receiving the saw blade and a guide portion for slidably receiving the blade receiving portion and for pivotally mounting the blade carrier to the housing;

a follower connected to the blade receiving portion of the blade carrier for transmitting reciprocating motion thereto generally along a first axis;

a bearing in engagement with the guide portion of the blade carrier for transmitting transverse motion to the blade carrier in a direction perpendicular to the first axis;

a ring gear rotatably engaged with the drive gear for rotation about an axis of rotation and having a pair of eccentric cam tracks formed on the ring gear operatively engaging the follower and bearing for driving the follower and bearing when the drive motor is rotating the ring gear for moving the blade carrier in an orbital path; and wherein one of said cam tracks has a non-circular configuration such that the time during which the saw blade moves in a cutting direction is greater than the time during which the saw blade moves in a return direction.

2. The reciprocating saw of claim 1 wherein said cam track having a non-circular configuration comprises a relatively long region of decreasing radius from said axis of rotation for driving the blade carrier in a manner to cause the saw blade to cut and a relatively short region of increasing radius from said axis of rotation for driving the blade carrier in a manner to cause the saw blade to return.

3. An orbital-action reciprocating saw for driving a saw blade, comprising:

a housing;

a drive motor located within the housing and having a rotatably driven drive gear;

a blade carrier having a blade receiving portion for receiving the saw blade and a guide portion pivotally mounted with respect to the housing for slidably receiving and supporting the blade receiving portion;

a follower connected to the blade receiving portion of the blade carrier for transmitting reciprocating motion thereto generally along a first axis;

a bearing in engagement with the guide portion of the blade carrier for transmitting transverse motion to the blade carrier in a direction perpendicular to the first axis; and a ring gear rotatable by the drive gear about an axis of rotation and having a pair of eccentric cam tracks formed on the ring gear in a driving relationship respectively with the follower and bearing for respectively driving the follower and bearing when the drive motor is rotating the ring gear for moving the blade carrier in an orbital path, wherein one of said eccentric cam tracks comprises a non-circular configuration such that the time during which the saw blade moves in a cutting direction is greater than the time during which the saw blade moves in a return direction.

4. The orbital action saw of claim 3 wherein said configuration has a relatively long region of decreasing radius from said axis of rotation for driving the blade carrier in a manner to cause said saw blade to cut and a relatively short region of increasing radius from said axis of rotation for driving the blade carrier in a manner to cause said saw blade to return.

5. The orbital action saw of claim 4 wherein said configuration has a curved portion and a relatively straight portion.

* * * * *